US012628824B2

(12) United States Patent　　(10) Patent No.: US 12,628,824 B2
Colla et al.　　　　　　　　　　　(45) Date of Patent: May 19, 2026

(54) FORMULATION FOR SEED TREATMENT COMPRISING FLUENSULFONE

(71) Applicants:Luiz Fernando Colla, Londrina (BR); Silvio Machado, Londrina (BR)

(72) Inventors: Luiz Fernando Colla, Londrina (BR); Silvio Machado, Londrina (BR)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 664 days.

(21) Appl. No.: 16/620,231

(22) PCT Filed: Jun. 7, 2018

(86) PCT No.: PCT/IB2018/000701
§ 371 (c)(1),
(2) Date: Dec. 6, 2019

(87) PCT Pub. No.: WO2018/229542
PCT Pub. Date: Dec. 20, 2018

(65) Prior Publication Data

US 2021/0092954 A1　　Apr. 1, 2021

Related U.S. Application Data

(60) Provisional application No. 62/517,379, filed on Jun. 9, 2017.

(51) Int. Cl.
*A01N 43/28*　　　(2006.01)
*A01N 25/04*　　　(2006.01)
*A01N 25/12*　　　(2006.01)

(52) U.S. Cl.
CPC ............. *A01N 43/28* (2013.01); *A01N 25/04* (2013.01); *A01N 25/12* (2013.01)

(58) Field of Classification Search
CPC ......... A01N 43/28; A01N 25/04; A01N 25/12
See application file for complete search history.

(56) References Cited

U.S. PATENT DOCUMENTS

| | | | |
|---|---|---|---|
| 5,085,698 A | 2/1992 | Ma et al. | |
| 5,708,095 A | 1/1998 | Grezzo Page et al. | |
| 6,153,705 A | 11/2000 | Corpart et al. | |
| 6,734,198 B1 | 5/2004 | Watanabe et al. | |
| 6,743,814 B2 | 6/2004 | Watanabe et al. | |
| 6,777,513 B1 | 8/2004 | Destarac et al. | |
| 2002/0151648 A1 | 10/2002 | Fasano et al. | |
| 2005/0215701 A1* | 9/2005 | Porsch ................... | C08G 18/10 524/589 |
| 2007/0155680 A1 | 7/2007 | Andersch et al. | |
| 2011/0039704 A1 | 2/2011 | Sixl et al. | |
| 2011/0224076 A1 | 9/2011 | Sowa | |
| 2011/0311503 A1 | 12/2011 | Christian et al. | |
| 2014/0141977 A1 | 5/2014 | Wacket et al. | |
| 2014/0148339 A1* | 5/2014 | Smejkal ............... | C07D 255/02 540/554 |
| 2014/0148493 A1* | 5/2014 | Tamura | |
| 2015/0208658 A1* | 7/2015 | El Qacemi ............. | A01N 43/36 548/240 |
| 2016/0262379 A1* | 9/2016 | Burnet ................... | A01N 25/08 |
| 2017/0172142 A1 | 6/2017 | Silbert et al. | |

FOREIGN PATENT DOCUMENTS

| | | |
|---|---|---|
| CN | 104430477 A | 3/2015 |
| CN | 104585224 A | 5/2015 |
| CN | 104585226 A | 5/2015 |
| CN | 104602520 A | 5/2015 |
| CN | 105638689 A | 6/2016 |
| JP | 2020002328 A * | 1/2020 |
| WO | WO 01/02378 A1 | 1/2001 |
| WO | WO 2001/002378 A1 | 1/2001 |
| WO | WO 2004/005268 | 1/2004 |
| WO | WO 2016/042557 | 3/2016 |
| WO | WO 2017/098325 | 6/2017 |
| WO | WO 2018/104787 | 6/2018 |
| WO | WO 2019/145857 | 8/2019 |
| WO | WO 2019/239358 | 12/2019 |

OTHER PUBLICATIONS

Merriam-Webster Dictionary definition of microsphere (1 page, accessed on Mar. 2, 2024, accessed from https://www.merriam-webster.com/dictionary/microsphere) (Year: 2024).*
Eghbal et al. (Appl. Sci., 2022, 12, 3837, pp. 1-26) (Year: 2022).*
Oliviero (Conference Proceedings 1695, 020042 (2015), pp. 1-6) (Year: 2015).*
International Search Report issued Sep. 5, 2018 in connection with PCT International Application No. PCT/IB2018/000701.
Written Opinion (form PCT/ISA/237) issued Sep. 5, 2018 in connection with PCT International Application No. PCT/IB2018/000701.
International Preliminary Report on Patentability issued Dec. 10, 2019 in connection with PCT International Application No. PCT/IB2018/000701, filed Jun. 7, 2018.
Office Action issued Aug. 10, 2022 in connection with Argentinian Application No. P 20180101548 (English translation).
First Office Action issued Apr. 21, 2021 in connection with Chinese Application No. 201880051494 (with (English translation).
Second Office Action issued Dec. 23, 2021 in connection with Chinese Application No. 201880051494 (with (English translation).
First Examination Report issued Jun. 30, 2021 in connection with Indian Application No. 201917051023.
Second Examination Report issued Feb. 28, 2022 in connection with Indian Application No. 201917051023.
Dec. 21, 2023 Second Office Action issued by the China National Intellectual Property Administration in connection with Chinese Patent Application No. 201880051494.2.

(Continued)

*Primary Examiner* — Alma Pipic

(74) *Attorney, Agent, or Firm* — Gary J. Gershik

(57) ABSTRACT

The present subject matter relates to seed treatment formulations comprising fluensulfone, their processes of preparation and methods of use.

14 Claims, 1 Drawing Sheet

(56) References Cited

OTHER PUBLICATIONS

Office Action issued Dec. 30, 2021 in connection with Argentinian Application No. 20180101548, filed Aug. 6, 2018.

Second Office Action issued Oct. 8, 2022 in connection with Argentinian Application No. 20180101548, filed Aug. 6, 2018.

Technical Report issued on Aug. 8, 2023 in connection with Brazilian Patent Application No. BR 1 2019 025864 7, including English language translation.

* cited by examiner

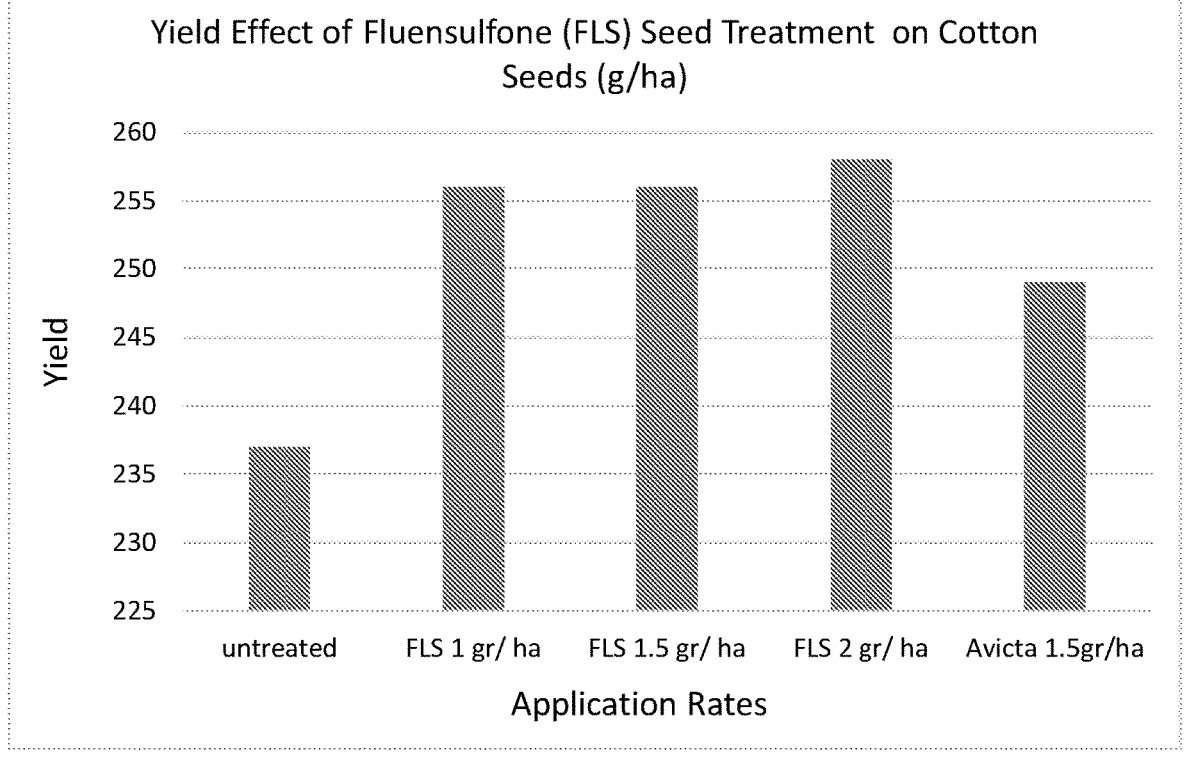

FORMULATION FOR SEED TREATMENT COMPRISING FLUENSULFONE

CROSS-REFERENCE TO RELATED APPLICATIONS

This application is a § 371 national stage of PCT International Application No. PCT/IB2018/000701, filed Jun. 7, 2018, claiming the benefit of U.S. Provisional Application No. 62/517,379, filed Jun. 9, 2017, the entire contents of each of which are hereby incorporated by reference herein.

The present subject matter relates to seed treatment formulations comprising fluensulfone, their processes of preparation and methods of use.

BACKGROUND

Nematodes are agricultural pests that attack a wide range of crops, including common vegetables, field crops, fruit trees and ornamentals. Nematodes are difficult to control and spread easily from one area to another through soil, tools or infested plants.

Fluensulfone (5-chloro-2-(3,4,4-trifluorobut-3-enylsulfonyl)-1,3-thiazole; CAS No. 318290-98-1) is a heterocyclic fluoroalkenyl sulfone nematicide which has a significantly reduced environmental impact with low toxicity to non-target insects and mammals. Fluensulfone's mode of action is distinct from currently available nematicides and therefore presents a promising entity for crop protection. Fluensulfone is also a very efficient active ingredient highly powerful against plant-parasitic nematodes compared to existing pesticides such as abamectin which also have some nematicidal activity.

Fluensulfone is being used on many crops via soil application.

In soil application, the fluensulfone is applied at least 7 days before planting and the fluensulfone is washed by a large amount of water.

There is a need for a simple, easy way to treat nematodes.

There is a need in the art to develop fluensulfone formulations that have high efficacy against nematodes and high selectivity to protect the crop (germination, plant standing, yield etc.).

SUMMARY

The present invention provides seed treatment formulations comprising fluensulfone that have high efficacy and crop selectivity. The seed treatment formulations described herein were developed based on the inventors' surprising finding that when fluensulfone is comprised or encapsulated in rheology modifying agents, it retains its nematicidal effects and is safe for use with seeds.

The present invention provides a formulation for seed treatment comprising an amount of fluensulfone.

The present invention provides a formulation for seed treatment comprising an amount of fluensulfone, an amount of film-forming polymers, and at least one agrochemically acceptable inert additive.

The present invention provides a formulation for seed treatment comprising an amount of fluensulfone, an amount of rheology modifying agent, and at least one agrochemically acceptable inert additive.

The present invention provides the use of fluensulfone as seed treatment for controlling nematode.

The present invention provides the use of fluensulfone as seed treatment.

The present invention provides a method of controlling nematodes comprising treating a seed of a host plant with an affective amount of fluensulfone so as to thereby control nematodes.

The present invention also provides a method for controlling nematodes comprising treating a seed of a host plant with the formulations described herein so as to thereby control nematodes.

The invention also provides a method for controlling nematodes comprising treating a seed of a host plant with an effective amount of fluensulfone and an effective amount of a rheology modifying agent so as to thereby control nematodes.

The present invention provides a process for preparing a seed treatment formulation comprising an amount of fluensulfone, an amount of a rheology modifying agent and at least one agrochemically acceptable inert additive, wherein the process comprises the steps of:

a) obtaining the amount of fluensulfone, the amount of the rheology modifying agent, and the agrochemically acceptable inert additive, and b) mixing the fluensulfone, the rheology modifying agent and the agrochemically acceptable inert additive to prepare the seed treatment formulation.

BRIEF DESCRIPTION OF THE DRAWINGS

FIG. 1 shows the effectiveness of fluensulfone seed treatment formulation on the yield cotton seeds at 1 g/ha, 1.5 g/ha and 2 g/ha, compared with untreated cotton seeds and with cotton seeds treated with Avicta™ 500 FS at 1.5 g/ha.

DETAILED DESCRIPTION

Definitions

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains.

The term "a" or "an" as used herein includes the singular and the plural, unless specifically stated otherwise. Therefore, the terms "a," "an," or "at least one" can be used interchangeably in this application.

Throughout the application, descriptions of various embodiments use the term "comprising", "consisting essentially of" or "consisting of."

As used herein, the term "about" when used in connection with a numerical value includes ±10% from the indicated values. In addition, the endpoints of all ranges directed to the same component or property herein are inclusive of the endpoints, are independently combinable, and include all intermediate points and ranges.

As used herein, the term "rheology modifying agent" refers to a compound other than the active ingredient(s) that is added to the formulation and influences the physical properties of the formulation such as viscosity. In particular, the rheology modifying agent encapsulates or entraps the active ingredient(s) such that the active ingredient(s) remain in, or in close proximity to the area the active ingredient(s) was applied for a substantially longer period of time compared to the period of time the active ingredient(s) would remain in the same area after a formulation without the rheology modifying agent is applied. The rheology modifying agent encapsulates or entraps the active ingredient(s) to control the release rate of the active ingredient(s) which prolongs the action, and to control the release of the active ingredient(s) to improve the residual activity and selectivity.

As used herein the term "interact chemically" or "interacted chemically" refer to a matrix structure wherein the fluensulfone interact with the rheology modifying agent through intermolecular force(s).

As used herein, the term "free of" when referring to a compound means that the compound was not affirmatively added to a formulation.

It is understood that where a parameter range is provided, all integers within that range, and tenths thereof, are also provided by the invention. For example, "0.1-40%" includes 0.1%, 0.2%, 0.3%, 0.4% etc. up to 40%.

The present invention provides a seed treatment formulation comprising an effective amount of fluensulfone.

In agriculture, growers have great difficulty in finding an effective control of nematodes that is still safe for plant propagating material such as seeds.

Seed treatment formulations must fulfill a number of special requirements which include applicability to seeds in commercial equipment, adhesion of the active ingredients to the treated seeds, and good flowability of the treated seeds. Of course, the treated seeds must still be capable of germination.

The seed treatment fluensulfone formulations described herein provide high efficiency, high crop selectivity and allow for reduced rates of application.

The present invention provides a formulation for seed treatment comprising an amount of fluensulfone, an amount of a rheology modifying agent, and at least one agrochemically acceptable inert additive.

In some embodiments, the amount of the fluensulfone is about 1% to about 90% of the total formulation by weight. In some embodiments, the amount of the fluensulfone is about 3% to about 80% of the total formulation by weight. In some embodiments, the amount of the fluensulfone is about 5% to about 60% of the total formulation by weight. In some embodiments, the amount of the fluensulfone is about 10% to about 40% of the total formulation by weight. In some embodiments, the amount of the fluensulfone is about 15% to about 30% of the total formulation by weight. In some embodiments, the amount of the fluensulfone is about 15% to about 25% of the total formulation by weight. In some embodiments, the amount of the fluensulfone is about 18% to about 22% of the total formulation by weight. In some embodiments, the amount of fluensulfone is about 20% of the total formulation by weight. In some embodiments, the amount of fluensulfone is 20% of the total formulation by weight.

In some embodiments, the amount of the rheology modifying agent is about 1% to about 90% of the total formulation by weight. In some embodiments, the amount of the rheology modifying agent is about 3% to about 80% of the total formulation by weight. In some embodiments, the amount of the rheology modifying agent is about 5% to about 60% of the total formulation by weight. In some embodiments, the amount of the rheology modifying agent is about 10% to about 50% of the total formulation by weight. In some embodiments, the amount of the rheology modifying agent is about 25% to about 40% of the total formulation by weight. In some embodiments, the amount of the rheology modifying agent is about 30% to about 37% of the total formulation by weight. In some embodiments, the amount of the rheology modifying agent is about 33% of the total formulation by weight. In some embodiments, the amount of the rheology modifying agent is 33% of the total formulation by weight. In some embodiments, the amount of the rheology modifying agent is about 30% of the total formulation by weight. In some embodiments, the amount of the rheology modifying agent is 30% of the total formulation by weight.

In some embodiments, the weight ratio between the rheology modifying agent to the fluensulfone is from about 5:1 to 1:5. In some embodiments, the weight ratio of the rheology modifying agent to the fluensulfone is from about 3:1 to about 1:3, preferably from about 3:1 to about 1:1, more preferably from about 1.5:1 to about 1:1. In some embodiments, the weight ratio between the rheology modifying agent to the fluensulfone is 1.5:1.

The weight ratio between the rheology modifying agent to the fluensulfone affect the efficacy of the fluensulfone.

In some embodiments, the rheology modifying agent functions as a film forming agent.

In some embodiments, the rheology modifying agent functions also as a film forming agent.

In some embodiments, the formulations described herein are used with one or more additional film forming polymer.

In some embodiments, the formulations described herein are used with one or more additional film forming agent.

In some embodiments, the formulations described herein are used with one or more additional coating agent.

In some embodiments, the formulations described herein are used with one or more additional coating polymer.

Rheology modifying agents that may be used in the subject formulation may include but are not limited to natural polymers, synthetic polymers, inorganic material or any combination thereof.

Natural polymers that may be used in the subject formulation may include but are not limited to polysaccharides including cellulose, agarose, dextran, alginates, carrageenans, starch, and chitosan; and proteins including gelatin and albumin; or any combination thereof.

Synthetic polymers that may be used in the subject formulation may include but are not limited to polystyrene, polyacrylamide, polymethylacrylates, polyamides, polyesters, polyanhydrides, polyurethanes, amino resins, polycyanoacrylates, or any combination thereof.

In preferred embodiments, the rheology modifying agent is a polyamide polymer. In preferred embodiments, the rheology modifying agent is a copolyamide. In preferred embodiments, the rheology modifying agent is a thermoplastic polyamide.

Polyamides that may be used in the subject formulation may include but are not limited to polyamides sold by Croda under the trademarks Atlox Rheostrux™ 200 PA, Atlox Rheostrux™ 100 PA and Atlox Rheostrux™ 300 PA, copolyamides sold by Arkema under the registered mark Platamid®, and thermoplastic polyamides sold by Dupont under the registered mark Elvamide® 8066.

In preferred embodiments, the rheology modifying agent is polyamides sold by Croda under the trademark Atlox Rheostrux™ 200 PA.

In some embodiments, the weight of the polymer is from 5000 to 100000 Da. In some embodiments, the polymer is polyamide. In some embodiments, the weight of the polyamide is from 10000 to 100000 Da.

Inorganic materials that may be used in the subject formulation may include but are not limited to silica, zeolites, inorganic oxides as well as glass beads and ceramics. The inorganic materials may also be organophilic clay such as organophilic clay 13088 and organophilic clay 13077 sold by Clariant.

In a preferred embodiment, the rheology modifying agent is an organophilic clay.

In some embodiments, the rheology modifying agent forms microspheres comprising the fluensulfone.

In some embodiments, the rheology modifying agent interacts with the fluensulfone through intermolecular force(s).

In some embodiments, the rheology modifying agent interact chemically with the fluensulfone through intermolecular force(s).

In some embodiments, the rheology modifying agent interact with the fluensulfone through intermolecular force(s) to form a matrix.

In some embodiments, the rheology modifying agent interact chemically with the fluensulfone through intermolecular force(s) to form a matrix.

In some embodiments, the rheology modifying agent forms film comprising the fluensulfone.

In some embodiments, rheology modifying agent is a film forming polymer.

In some embodiments, the rheology modifying agent is poly amide.

In a microsphere, the active ingredient is dispersed or dissolved in a rate-controlling polymer matrix. The rate of release of the active ingredient from a poly matrix depends on the nature of the active ingredient, the polymer and the geometry of the matrix system. The release rate also depends on the loaded amount of the active ingredient within the polymer matrix. When the loading is low, a slower release can be observed.

In some embodiments, the rheology modifying agent is a polymer and the polymers form solid microspheres comprising the fluensulfone.

The polymers are capable for forming solidified microspheres with fluensulfone inside due to the low solidification temperature of the polymer.

In some embodiments, the polymers are capable of forming a film over the seed comprising fluensulfone.

In some embodiments, the formulation further comprises a solidifier. Solidifiers may be used to aid formation of matrix microspheres.

In some embodiments, the rheology modifying agent forms microcapsules encapsulating the fluensulfone. In some embodiments, the rheology modifying agent forms capsules encapsulating the fluensulfone.

In some embodiments, the fluensulfone is formulated for controlled release.

In some embodiments, the formulation further comprises an agriculturally acceptable inert additive. In some embodiments, the agriculturally acceptable inert additive is selected from a group consisting of surfactants, emulsifiers, solvents, stabilizers, light stabilizers, UV absorbers, radical scavengers and antioxidants, adhesives, neutralizers, thickeners, binders, sequestrates, biocides, buffers preservatives, antifreeze agents, and any combination thereof.

In some embodiments, the surfactant is selected from a group consisting of alkyl sulfonates, alkyl benzene sulfonates, alkyl aryl sulfonates, alkylphenolalkoxylates, tristyrylphenol ethoxylates, natural or synthetic fatty ethoxylate alcohols, natural or synthetic fatty acid alkoxylates, natural or synthetic fatty alcohols alkoxylates, alkoxylated alcohols (such as n-butyl alcohol poly glycol ether), polyvinyl alcohols and combinations thereof.

In some embodiments, the surfactant is a block copolymer. In some embodiments, the block copolymer is an ethylene oxide-propylene oxide block copolymer. In some embodiments, the block copolymer is an ethylene oxide-butylene oxide block copolymer.

In some embodiments, the surfactant is not a block copolymer.

In some embodiments, the amount of surfactant(s) present in the composition is between 0.1-40% by weight based on the total weight of the composition.

In some embodiments, the formulation comprises at least one emulsifier. In some embodiments, the formulation comprises two emulsifiers. In some embodiments, the formulation comprises three emulsifiers.

In some embodiments, the emulsifier is selected from a group consisting of alkoxylated vegetable oil, ethoxylated vegetable oil, dodecylbenzene calcium sulfonate, ethylene oxide-propylene oxide di-block copolymer, ethylene oxide-propylene oxide tri-block copolymer, poly(ethylene glycol-ran-propylene glycol) monobutyl ether and combinations thereof.

In some embodiments, the formulation comprises a first emulsifier, a second emulsifier and a third emulsifier wherein the first emulsifier is ethoxylated vegetable oil, the second emulsifier is dodecylbenzene calcium sulfonate, and the third emulsifier is poly(ethylene glycol-ran-propylene glycol) monobutyl ether.

In some embodiments, the amount of emulsifier(s) present in the formulation is between 0.1-40% by weight based on the total weight of the formulation. In some embodiments, the amount of emulsifier(s) present in the formulation is between 0.1-40% by weight based on the total weight of the formulation. In some embodiments, the amount of emulsifier(s) present in the formulation is between 0.1-15% by weight based on the total weight of the formulation. In some embodiments, the amount of emulsifier(s) present in the formulation is between 2-10% by weight based on the total weight of the formulation. In some embodiments, the amount of emulsifier(s) present in the formulation is between 5-7% by weight based on the total weight of the formulation. In some embodiments, the amount of emulsifier(s) present in the formulation is about 6% by weight based on the total weight of the formulation.

In some embodiments, the formulation comprises one emulsifier and the amount of emulsifier in the formulation is between 0.1-40% by weight based on the total weight of the formulation. In some embodiments, the formulation comprises one emulsifier and the amount of emulsifier present in the formulation is between 0.1-40% by weight based on the total weight of the formulation. In some embodiments, the formulation comprises one emulsifier and the amount of emulsifier present in the formulation is between 0.1-15% by weight based on the total weight of the formulation. In some embodiments, the formulation comprises one emulsifier and the amount of emulsifier present in the formulation is between 2-10% by weight based on the total weight of the formulation. In some embodiments, the formulation comprises one emulsifier and the amount of emulsifier present in the formulation is between 5-7% by weight based on the total weight of the formulation. In some embodiments, the formulation comprises one emulsifier and the amount of emulsifier present in the formulation is about 6% by weight based on the total weight of the formulation.

In some embodiments, the formulation comprises two emulsifiers, wherein the amount of the first emulsifier is between 0.05-5% by weight based on the total weight of the formulation and the amount of the second emulsifier is between 0.05-10% by weight based on the total weight of the formulation. In some embodiments, the formulation comprises two emulsifiers, wherein the amount of the first emulsifier is between 1.5-2.9% by weight based on the total weight of the formulation and the amount of the second emulsifier is between 3.4-4.8% by weight based on the total weight of the formulation. In some embodiments, the formulation comprises two emulsifiers, wherein the amount of the first emulsifier is between 1.8-2.6% by weight based on the total weight of the formulation and the amount of the second emulsifier is between 3.7-4.5% by weight based on the total weight of the formulation. In some embodiments, the formulation comprises two emulsifiers, wherein the amount of the first emulsifier is 2.2% by weight based on the total weight of the formulation and the amount of the second emulsifier is 4.1% by weight based on the total weight of the formulation.

In some embodiments, the formulation comprises three emulsifiers wherein the amount of the first emulsifier is between 0.03-5% by weight based on the total weight of the formulation, the amount of the second emulsifier is between 0.03-5% by weight based on the total weight of the formulation and the amount of the third emulsifier is between 0.03-5% by weight based on the total weight of the formulation. In some embodiments, the formulation comprises three emulsifiers wherein the amount of the first emulsifier is between 2.2-3.5% by weight based on the total weight of the formulation, the amount of the second emulsifier is between 1.5-2.6% by weight based on the total weight of the formulation and the amount of the third emulsifier is between 0.8-1.7% by weight based on the total weight of the formulation. In some embodiments, the formulation comprises three emulsifiers wherein the amount of the first emulsifier is between 2.5-3.2% by weight based on the total weight of the formulation, the amount of the second emulsifier is between 1.8-2.3% by weight based on the total weight of the formulation and the amount of the third emulsifier is between 1.1-1.4% by weight based on the total weight of the formulation. In some embodiments, the formulation comprises three emulsifiers wherein the amount of the first emulsifier is 2.9% by weight based on the total weight of the formulation, the amount of the second emulsifier is about 2% by weight based on the total weight of the formulation and the amount of the third emulsifier is about 1.3% by weight based on the total weight of the formulation.

In some embodiments, the formulation comprises at least one stabilizer. In some embodiments, the formulation comprises two stabilizers. In some embodiments, the formulation comprises three stabilizers.

In some embodiments, the stabilizer(s) are selected from a group consisting of epoxidated vegetable oil, pentaerythritol tetrakis(3,5-di-tert-butyl-4-hydroxyhydrocinnamate), tris(2,4-di-tert-butylphenyl)phosphite, benzotriazole, 2,2,6, 6-tetramethylpiperidine, 2,6-di-tert-butyl-p-cresol, N,N'-di-2-butyl-1,4-phenylenediamine and combinations thereof.

In some embodiments, the formulation comprises a first stabilizer and a second stabilizer wherein the first stabilizer is 2,6-di-tert-butyl-p-cresol and the second stabilizer is epoxidated vegetable oil. In some embodiments, the epoxidated vegetable oil is epoxidated soybean oil.

In some embodiments, the amount of stabilizer(s) present in the formulation is between 0.1-10% by weight based on the total weight of the formulation. In some embodiments, the amount of stabilizer(s) present in the formulation is between 0.1-5% by weight based on the total weight of the formulation. In some embodiments, the amount of stabilizer (s) present in the formulation is between 0.1-1% by weight based on the total weight of the formulation. In some embodiments, the amount of stabilizer(s) present in the formulation is between 0.2-0.7% by weight based on the total weight of the formulation. In some embodiments, the amount of stabilizer(s) present in the formulation is between 0.4-0.5% by weight based on the total weight of the formulation. In some embodiments, the amount of stabilizer(s) present in the formulation is about 0.45% by weight based on the total weight of the formulation.

In some embodiments, the formulation comprises one stabilizer and the amount of the stabilizer present in the formulation is between 0.1-10% by weight based on the total weight of the formulation. In some embodiments, the formulation comprises one stabilizer and the amount of the stabilizer present in the formulation is between 0.1-5% by weight based on the total weight of the formulation. In some embodiments, the formulation comprises one stabilizer and the amount of the stabilizer present in the formulation is between 0.1-1% by weight based on the total weight of the formulation. In some embodiments, the formulation comprises one stabilizer and the amount of the stabilizer present in the formulation is between 0.2-0.7% by weight based on the total weight of the formulation. In some embodiments, the formulation comprises one stabilizer and the amount of the stabilizer present in the formulation is between 0.4-0.5% by weight based on the total weight of the formulation. In some embodiments, the formulation comprises one stabilizer and the amount of the stabilizer present in the formulation is about 0.45% by weight based on the total weight of the formulation.

In some embodiments, the formulation comprises two stabilizers and the amount of the first stabilizer is between 0.05-1% by weight based on the total weight of the formulation and the amount of the second stabilizer is between 0.05-1% by weight based on the total weight of the formulation. In some embodiments, the formulation comprises two stabilizers and the amount of the first stabilizer is between 0.15-0.3% by weight based on the total weight of the formulation and the amount of the second stabilizer is between 0.15-0.3% by weight based on the total weight of the formulation. In some embodiments, the formulation comprises two stabilizers and the amount of the first stabilizer is between 0.2-0.25% by weight based on the total weight of the formulation and the amount of the second stabilizer is between 0.2-0.25% by weight based on the total weight of the formulation. In some embodiments, the formulation comprises two stabilizers and the amount of the first stabilizer is about 0.2% by weight based on the total weight of the formulation and the amount of the second stabilizer is about 0.2% by weight based on the total weight of the formulation. In some embodiments, the formulation comprises two stabilizers and the amount of the first stabilizer is 0.22% by weight based on the total weight of the formulation and the amount of the second stabilizer is 0.22% by weight based on the total weight of the formulation.

In some embodiments, the formulation comprises three stabilizers wherein the amount of the first stabilizer is between 0.03-0.3% by weight based on the total weight of the formulation, the amount of the second stabilizer is between 0.03-0.5% by weight based on the total weight of the formulation and the amount of the third stabilizer is 0.03-0.3% by weight based on the total weight of the formulation. In some embodiments, the formulation comprises three stabilizers wherein the amount of the first stabilizer is between 0.05-0.17% by weight based on the total weight of the formulation, the amount of the second stabilizer is between 0.17-0.28% by weight based on the total weight of the formulation and the amount of the third stabilizer is between 0.05-0.17% by weight based on the total weight of the formulation. In some embodiments, the formulation comprises three stabilizers wherein the amount of the first stabilizer is between 0.08-0.14% by weight based on the total weight of the formulation, the amount of the second stabilizer is between 0.2-0.25% by weight based on the total weight of the formulation and the amount of the third stabilizer is between 0.08-0.14% by weight based on the total weight of the formulation. In some embodiments, the formulation comprises three stabilizers wherein the amount of the first stabilizer is 0.11% by weight based on the total weight of the formulation, the amount of the second stabilizer is 0.23% by weight based on the total weight of the formulation and the amount of the third stabilizer is 0.11% by weight based on the total weight of the formulation.

In some embodiments, the formulation comprises at least one light stabilizer, at least one UV absorber, at least one radical scavenger and/or at least one antioxidant selected from a group consisting of 2,2,6,6-tetramethylpiperidine, 2,6-di-tert-butyl-p-cresol, N,N'-di-2-butyl-1,4-phenylenediamine and combinations thereof.

In some embodiments, the amount of light stabilizer(s)/antioxidant(s) present in the composition is between 0.1-10% by weight based on the total weight of the composition. In some embodiments, the amount of light stabilizer(s)/antioxidant(s) present in the composition is between 0.1-5% by weight based on the total weight of the composition. In some embodiments, the amount of light stabilizer(s)/antioxidant(s) present in the composition is between 0.1-1% by weight based on the total weight of the composition. In some embodiments, the amount of light stabilizer(s)/antioxidant(s) present in the composition is between 0.2-0.7% by weight based on the total weight of the composition. In some embodiments, the amount of light stabilizer(s)/antioxidant(s) present in the composition is between 0.4-0.5% by weight based on the total weight of the composition.

In some embodiments, the amount of light stabilizer(s)/antioxidant(s) present in the composition is about 0.45% by weight based on the total weight of the composition.

In some embodiments, the formulation comprises at least one solvent. In some embodiments, the formulation comprises two solvents. In some embodiments, the formulation comprises three solvents.

In some embodiments, the solvent is selected from a group consisting of aromatic hydrocarbon, non-aromatic hydrocarbon, toluene, o-xylene, m-xylene, p-xylene, ethylbenzene, isopropylbenzene, tert-butylbenzene, naphthalenes, mono- or polyalkyl-substituted naphthalenes, naphthalene solvent, heavy aromatic naphthalene solvent, ultra-low naphthalene solvent (ULN), low naphthalene solvent (LN), C12 aromatic hydrocarbon, Solvesso™ grades from ExxonMobil Chemical, especially Solvesso™ 100 (CAS No. 64742-95-6), Solvesso™ 150 (CAS No. 64742-94-5), and Solvesso™ 200 (CAS No. 64742-94-5), Caromax 28 LN, paraffin, octane, nonane, decane, undecane, dodecane, tridecane, tetradecane, pentadecane, hexadecane, hepta-decane, octa-decane, nona-decane, eicosane, heneicosane, docosane, tricosane, tetracosane, pentacosane, hexane and cyclohexane, petroleum, diesel, vegetable oil (such as olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil), alkyl ester of vegetable oil (such as rapeseed oil methyl ester, rapeseed oil ethyl ester, rapeseed oil propyl esters, rapeseed oil butyl esters, and tall oil fatty acids esters), mineral oil, alkyl carbonates (such as ethylene carbonate and propylene carbonate), ester of fatty acids, alkyl ester of fatty acids (such as C1-C4 monohydric alcohol esters of C8 to C22 fatty acids such as methyl oleate and ethyl oleate), fatty acid amide (such as C1-C3 amines, alkylamines and alkanolamines with C6-C18 carboxylic acids), Stepan™ C-25, ester and/or amide of organic acids, glycol, tall oil fatty acids, ethyl lactate, dimethylsulfoxid, propylene glycol and any combination thereof.

In some embodiments, the formulation comprises a first solvent, a second solvent and a third solvent, wherein the first solvent is propylene carbonate, the second solvent is a heavy aromatic naphthalene solvent, and the third solvent is water.

In some embodiments, the solvent is an organic solvent.

In some embodiments, the amount of the organic solvent (s) in the composition is 10-90% by weight based on the total weight of the composition. In some embodiments, the amount of the organic solvent(s) is 40-80% by weight based on the total weight of the composition. In some embodiments, the amount of the organic solvent(s) is 50-60% by weight based on the total weight of the composition. In some embodiments, the amount of the organic solvent(s) is 15-50% by weight based on the total weight of the composition. In some embodiments, the amount of the organic solvent(s) is 20-40% by weight based on the total weight of the composition. In some embodiments, the amount of the organic solvent(s) is 25-40% by weight based on the total weight of the composition. In some embodiments, the amount of the organic solvent(s) is 34% by weight based on the total weight of the composition.

In some embodiments, the amount of the organic solvent(s) in the composition is 10-50% by weight based on the total weight of the composition.

In some embodiments, the concentration of the organic solvent(s) in the composition is 100-400 g/L.

In some embodiments, the solvent is water.

In some embodiments, the formulation comprises an aromatic solvent and a non-aromatic solvent. In some embodiments, the formulation comprises an aromatic solvent and water. In some embodiments, the formulation comprises a non-aromatic solvent and water. In some embodiments, the formulation comprises an aromatic solvent, a non-aromatic solvent and water.

In some embodiments, the amount of water present in the composition is between 10-40% by weight based on the total weight of the formulation.

In some embodiments, the concentration of the water in the formulation is 100-400 g/L.

In some embodiments, the amount of solvent(s) in the formulation between 10-90% by weight based on the total weight of the formulation. In some embodiments, the amount of solvent(s) in the formulation between 20-75% by weight based on the total weight of the formulation. In some embodiments, the amount of solvent(s) in the formulation between 35-60% by weight based on the total weight of the formulation. In some embodiments, the amount of solvent(s) in the formulation between 40-55% by weight based on the total weight of the formulation. In some embodiments, the amount of solvent(s) in the formulation between 40-53% by weight based on the total weight of the formulation. In some embodiments, the amount of solvent(s) in the formulation is about 46% by weight based on the total weight of the formulation. In some embodiments, the amount of solvent(s) in the formulation is 46% by weight based on the total weight of the formulation. In some embodiments, the amount of solvent(s) in the formulation is about 49% by weight based on the total weight of the formulation. In some embodiments, the amount of solvent(s) in the formulation is 49% by weight based on the total weight of the formulation.

In some embodiments, the formulation comprises one solvent and the amount of the solvent in the formulation between 10-90% by weight based on the total weight of the formulation. In some embodiments, the formulation comprises one solvent and the amount of the solvent in the formulation between 20-75% by weight based on the total weight of the formulation. In some embodiments, the formulation comprises one solvent and the amount of the solvent in the formulation between 35-60% by weight based on the total weight of the formulation. In some embodiments, the formulation comprises one solvent and the amount of the solvent in the formulation between 40-55% by weight based on the total weight of the formulation. In some embodiments, the formulation comprises one solvent and the amount of the solvent in the formulation between 40-53% by weight based on the total weight of the formulation. In some embodiments, the formulation comprises one solvent and the amount of the solvent in the formulation about 46% by weight based on the total weight of the formulation. In some embodiments, the formulation comprises one solvent and the amount of the solvent in the formulation 46% by weight based on the total weight of the formulation. In some embodiments, the formulation comprises one solvent and the amount of the solvent in the formulation is about 49% by weight based on the total weight of the formulation. In some embodiments, the formulation comprises one solvent and the amount of the solvent in the formulation is 49% by weight based on the total weight of the formulation.

In some embodiments, the formulation comprises two solvents wherein the amount of the first solvent is between 5-85% by weight based on the total weight of the formulation and the amount of the second solvent is 5-85% by weight based on the total weight of the formulation. In some embodiments, the formulation comprises two solvents wherein the amount of the first solvent is between 10-28% by weight based on the total weight of the formulation and the amount of the second solvent is 18-36% by weight based on the total weight of the formulation. In some embodiments, the formulation comprises two solvents wherein the amount of the first solvent is between 13-25% by weight based on the total weight of the formulation and the amount of the second solvent is 21-33% by weight based on the total weight of the formulation. In some embodiments, the formulation comprises two solvents wherein the amount of the first solvent is 19% by weight based on the total weight of the formulation and the amount of the second solvent is 27% by weight based on the total weight of the formulation.

In some embodiments, the formulation comprises three solvents, wherein the amount of the first solvent is 3-83% by weight based on the total weight of the formulation, the amount of the second solvent is 3-83% based on the total weight of the formulation and the amount of the third solvent is between 3-83% by weight based on the total weight of the formulation. In some embodiments, the formulation comprises three solvents, wherein the amount of the first solvent is between 1-9% by weight based on the total weight of the formulation, the amount of the second solvent is between 8-18% based on the total weight of the formulation and the amount of the third solvent is between 20-35% by weight based on the total weight of the formulation. In some embodiments, the formulation comprises three solvents, wherein the amount of the first solvent is between 4-6% by weight based on the total weight of the formulation, the amount of the second solvent is between 11-15% based on the total weight of the formulation and the amount of the third solvent is between 23-32% by weight based on the total weight of the formulation. In some embodiments, the formulation comprises three solvents, wherein the amount of the first solvent is 5% by weight based on the total weight of the formulation, the amount of the second solvent is 13% based on the total weight of the formulation and the amount of the third solvent is 28% by weight based on the total weight of the formulation. In some embodiments, the formulation comprises three solvents, wherein the amount of the first solvent is 5% by weight based on the total weight of the formulation, the amount of the second solvent is 13% based on the total weight of the formulation and the amount of the third solvent is 30% by weight based on the total weight of the formulation.

In some embodiments, the formulation comprises a carrier. In some embodiments, the carrier is a liquid carrier. In some embodiments, the liquid carrier is water.

In some embodiments, the formulation is a liquid formulation. In some embodiments, the liquid formulation is a suspension concentrate, a capsule suspension, a flowable concentrate, or a suspo-emulsion. In some embodiments, the formulation is a solid formulation. In some embodiments, the solid formulation is a powder.

Each of the aforementioned type of components can be combined like a matrix as needed. Thus, for example, formulations of the subject invention may comprise the following formulations.

In some embodiments, the formulation comprises fluensulfone, polyamide polymer, three emulsifiers, two stabilizers, and three solvents, wherein:

a) the first emulsifier is ethoxylated vegetable oil, b) the second emulsifier is dodecyl benzene calcium sulfonate, c) the third emulsifier is poly(ethylene glycol-ran-propylene, glycol) monobutyl ether, d) the first stabilizer is 2,6-di-tert-butyl-β-cresol, e) the second stabilizer is epoxidated vegetable oil, f) the first solvent is propylene carbonate, g) the second solvent is a heavy aromatic naphthalene solvent, and h) the third solvent is water.

In some embodiments, the formulation is a suspension concentrate.

In some embodiments, the formulation is a powder for dry seed treatment. In some embodiments, the formulation is an oil dispersion. In some embodiments, the formulation is a water dispersion. In some embodiments, the formulation is a capsule suspension.

In one embodiment, 25% to 100% of the fluensulfone is released from the microspheres, capsules or microcapsules within 25 days from the time the treated seeds are placed in soil. In one embodiment, 50% to 100% of the fluensulfone is released from the microspheres, capsules or microcapsules within 25 days from the time the treated seeds are placed in soil. In one embodiment, 75% to 100% of the fluensulfone is released from the microspheres, capsules or microcapsules within 25 days from the time the treated seeds are placed in soil. In one embodiment, 80% to 100% of the fluensulfone is released from the microspheres, capsules or microcapsules within 25 days from the time the treated seeds are placed in soil. In one embodiment, 90% to 100% of the fluensulfone is released from the microspheres, capsules or microcapsules within 25 days from the time the treated seeds are placed in soil.

Release rate of the fluensulfone is influenced by the hydrophobicity of the rheology modify agents.

The present invention further provides a formulation for seed treatment comprising:

(i) an effective amount of fluensulfone;

(ii) polyamide polymer; and (iii) a liquid carrier.

The present invention provides a polyamide microsphere formulation comprising:

(i) an effective amount of fluensulfone; and (ii) an effective amount of polyamide polymer;

wherein the polyamide polymer forms microspheres comprising the fluensulfone.

The present invention provides a polyamide microcapsule formulation comprising:

(i) an effective amount of fluensulfone; and (ii) an effective amount of polyamide polymer;

wherein the polyamide polymer forms microcapsules encapsulating the fluensulfone.

The present invention provides a polyamide capsule formulation comprising:

(i) an effective amount of fluensulfone; and (ii) an effective amount of polyamide polymer;

wherein the polyamide polymer forms capsules encapsulating the fluensulfone.

In some embodiments of the formulations described herein, the agriculturally acceptable inert additive is other than a block copolymer. In some embodiments, the agriculturally acceptable inert additive is other than a diblock copolymer. In some embodiments, the agriculturally acceptable inert additive is other than a block copolymer comprising ethyl acrylate (EA) and 2-acrylamido-2-methylpropane sulphonate (AMPS). In some embodiments, the agriculturally acceptable inert additive is other than sodium 2-acryloylamino-2-methylpropane-1-sulfonate/ethyl acrylate block copolymers.

In some embodiments, the agriculturally acceptable inert additive is other than a cyclic ketone. In some embodiments, the agriculturally acceptable inert additive is other than acetophenone.

In some embodiments, the formulation is free of block copolymers. In some embodiments, the formulation is free of diblock copolymers. In some embodiments, the formulation is free of block copolymer comprising ethyl acrylate (EA) and 2-acrylamido-2-methylpropane sulphonate (AMPS). In some embodiments, the formulation is free of sodium 2-acryloylamino-2-methylpropane-1-sulfonate/ethyl acrylate block copolymers.

In some embodiments, the formulation is free of cyclic ketone. In some embodiments, the formulation is free of acetophenone.

In some embodiments, the formulation is free of aromatic hydrocarbon. In some embodiments, the formulation is free of heavy aromatic solvent naphtha (petroleum). In some embodiments, the formulation is free of a compound with CAS No. 64742-94-5.

In some embodiments, the mixture is free of block copolymers. In some embodiments, the mixture is free of diblock copolymers. In some embodiments, the mixture is free of block copolymer comprising ethyl acrylate (EA) and 2-acrylamido-2-methylpropane sulphonate (AMPS). In some embodiments, the mixture is free of sodium 2-acryloylamino-2-methylpropane-1-sulfonate/ethyl acrylate block copolymers.

In some embodiments, the mixture is free of cyclic ketone. In some embodiments, the mixture is free of acetophenone.

In some embodiments, the mixture is free of aromatic hydrocarbon. In some embodiments, the mixture is free of heavy aromatic solvent naphtha (petroleum). In some embodiments, the mixture is free of a compound with CAS No. 64742-94-5.

In some embodiments, the formulation is other than an oil-in-water emulsion formulation comprising fluensulfone, acetophenone, 2,6-di-tert-butyl-4-methylphenol, castor oil ethylene oxide, sodium 2-acryloylamino-2-methylpropane-1-sulfonate/ethyl acrylate block copolymer, ethoxylated polypropylene oxide, propylene glycol, silicone based antifoaming agent and water.

In some embodiments, the formulation is other than an oil-in-water emulsion formulation comprising 51% by weight of fluensulfone, 16.8% by weight of acetophenone, 0.4% by weight of 2,6-di-tert-butyl-4-methylphenol, 1% by weight of castor oil ethylene oxide, 2.78% by weight of sodium 2-acryloylamino-2-methylpropane-1-sulfonate/ ethyl acrylate block copolymer, 2.78% by weight of ethoxylated polypropylene oxide, 2.2% by weight of propylene glycol, 0.1% by weight of silicone based antifoaming agent and 23% by weight of water.

In some embodiments, the formulation is stable at a temperature of 40° C. over a period of 8 weeks.

The present invention provides a mixture of an effective amount of fluensulfone and an effective amount of rheology modifying agent.

In some embodiments, the mixture is a tank mix. In some embodiments, the mixture is applied separately. In some embodiments, the mixture applied together as single composition or in two separate composition. In some embodiments, the mixture is applied simultaneously.

In some embodiments, rheology modifying agent is added to the tank mix not in the form of a composition.

In some embodiments, the seed are first treated with the rheology modifying agent and then with fluensulfone.

The present invention provides the use of rheology modifying for increasing crop yield when the crop is treated with fluensulfone.

The present invention provides a method for increasing crop yield, comprising applying to the crop seed an effective amount of the mixtures and/or compositions described herein.

The invention provides a method for controlling nematodes comprising treating a seed of a host plant with the formulations described herein so as to thereby control nematodes.

The invention also provides a method for controlling nematodes comprising treating a seed of a host plant with an effective amount of fluensulfone and an effective amount of a rheology modifying agent so as to thereby control nematodes.

The invention also provides a method for controlling nematodes comprising treating a seed of a host plant with an effective amount of fluensulfone so as to thereby control nematodes.

In some embodiments, the fluensulfone and the rheology modifying agent are in a formulation. The formulation may be any one of the formulations described herein.

In some embodiments, the fluensulfone and the rheology modifying agent are tank mixed prior to application.

In some embodiments, the fluensulfone and the rheology modifying agent are applied simultaneously.

In some embodiments, the fluensulfone and the rheology modifying agent are applied sequentially.

In some embodiments, the rate of application of fluensulfone as seed treatment is from 3g/ha to about 50 g/ha.

In some embodiments, the rate of application of fluensulfone is from about 5 g/ha to 20 g/ha.

In some embodiment, the host plant is cotton and the application rate is 7.5 g/ha of fluensulfone.

In some embodiment, the host plant is soybean and the application rate is from about 17.5 to 24.5 g/ha of fluensulfone.

In some embodiments, the formulation is applied at a rate of 10 to 100 g of fluensulfone per 100 kg of seeds.

In some embodiments, the formulation is applied at a rate of 20 to 90 g of fluensulfone per 100 kg of seeds. In some embodiments, the formulation is applied at a rate of 30 to 80 g of fluensulfone per 100 kg of seeds. In some embodiments, the formulation is applied at a rate of 40 to 60 g of fluensulfone per 100 kg of seeds. In some embodiments, the formulation is applied at a rate of 25 to 35 g of fluensulfone per 100 kg of seeds.

In some embodiments, the host plant is soybean, corn, sunflower, drybean, cotton, or wheat.

In some embodiments, the nematode is Reniform nematode, *Rotlyenchulus* spp.; Dagger nematode, *Xiphinema* spp.; Lance nematode, *Hoplolaimus* spp.; Pin nematode, *Paratylenchus* spp.; Ring nematode, *Criconemoides* spp.; Rootknot nematode, *Meloidogyne* spp.; Sheath nematode, *Hemicycliophora* spp.; Spiral nematode, *Helicotylenchus* spp.; Stubbyroot nematode, *Trichodorus* spp.; Cyst nematode, *Heterodera* spp.; Sting nematode, *Belonolaimus,* spp.; and/or Stunt nematode, *Tylenchorhynchus* spp. In some embodiments, the nematode is *Meloidogyne* spp., *Pratylenchus* spp., or *Heterodera* spp. In some embodiments, the nematode is *Meloidogyne javanica.* In some embodiments, the nematode is *Heterodera glycines.*

In some embodiment, treating the seeds with the formulation is effective to reduce nematode population by at least 60% compared to the nematode population at sowing. In some embodiments, treating the seeds with the formulation is effective to reduce nematode population by at least 70% compared to the nematode population at sowing. In some embodiments, treating the seeds with the formulation is effective to reduce nematode population by at least 80% compared to the nematode population at sowing. In some embodiments, treating the seeds with the formulation is effective to reduce nematode population by at least 85% compared to the nematode population at sowing. In some embodiments, the percentage reduction of nematode population is measured at 45 days after emergence.

The present invention also provides a process for preparing a seed treatment formulation described herein, wherein the process comprises the steps of:

a) obtaining the amount of fluensulfone, the amount of the rheology modifying agent, and the agrochemically acceptable inert additive, and b) mixing the fluensulfone, the rheology modifying agent and the agrochemically acceptable inert additive to prepare the seed treatment formulation.

In some embodiments, step b) comprises heating the mixture at a temperature of 70° C. to 95° C. In some embodiments, step b) comprises heating the mixture at a temperature of 80° C. to 85° C. In some embodiments, the mixture is heated until the fluensulfone and the rheology modifying agent are melted.

In some embodiments, the process further comprises adding water to the mixture comprising the melted fluensulfone and rheology modifying agent.

In some embodiments, room temperature water is added.

In some embodiments, the water is added under 1200-2200 rpm shear. In some embodiments, the water is added under 1700 rpm shear.

In some embodiments, the process further comprises cooling the mixture to a temperature of 40° C. or less to obtain the seed treatment formulation.

In some embodiments, the fluensulfone obtained has a purity of greater than 95%. In some embodiments, the fluensulfone obtained has a purity of greater than 98%. In some embodiments, the fluensulfone obtained has a purity of 100%.

In some embodiments, the fluensulfone is obtained in a formulation.

In some embodiments, the rheology modify agent is selected from a group consisting of natural polymers, synthetic polymers, inorganic material and any combination thereof.

In some embodiments, the rheology modify agent is natural polymer selected from the group consisting of cellulose, agarose, dextran, alginates, carrageenans, starch, chitosan, gelatin, albumin, and any combination thereof.

In some embodiments, the rheology modify agent is synthetic polymer selected from a group consisting of polystyrene, polyacrylamide, polymethylacrylates, polyamides, polyesters, polyanhydrides, polyurethanes, amino resins, polycyanoacrylates, and any combination thereof.

In some embodiments, the seed treatment formulation is in liquid form. In some embodiments, the liquid is a solution.

In some embodiments, the solution is an organic solution. In some embodiments, the solution is an inorganic solution.

In some embodiments, the rheology modifying agent is mixed with other agrochemically acceptable inert additives and/or solvents prior to mixing with the fluensulfone formulation.

In some embodiments, the fluensulfone formulation is mixed with other agrochemically acceptable inert additives and/or solvents prior to mixing with the rheology modifying agent.

In some embodiments, the solvent is an organic solvent. In some embodiments, the fluensulfone is dissolved in the organic solvent. In some embodiments, the fluensulfone is dispersed in the organic solvent.

Organic solvents may include but are not limited to aromatic hydrocarbons, paraffins, petroleum, vegetable oil, alkyl ester of vegetable oils, diesel, mineral oil, fatty acid amides, fatty acids, alkyl esters of fatty acids, modified vegetable oils or a combination thereof.

In some embodiments, the solvent is not an aromatic hydrocarbon. In some embodiments, the solvent is not heavy aromatic solvent naphtha (petroleum). In some embodiments, the solvent is not a compound with CAS No. 64742-94-5.

In some embodiments, the seed treatment formulation is a suspension concentrate.

In some embodiments, the suspension concentrate is prepared by:

a) obtaining the amount of fluensulfone, the amount of rheology modifying agent, and the agrochemically acceptable inert additive, b) heating the rheology modifying agent, and c) mixing the heated rheology modifying agent with the obtained fluensulfone and the agrochemically acceptable inert additive to prepare the seed treatment formulation.

In some embodiments, the suspension concentration is prepared by:

(a) obtaining the amount of fluensulfone, the amount of rheology modifying agent, and the agrochemically acceptable inert additive, (b) heating the rheology modifying agent and the fluensulfone, and (c) mixing the heated rheology modifying agent and fluensulfone with the agrochemically acceptable inert additive to prepare the suspension concentrate seed treatment formulation.

In some embodiments, the suspension concentration is prepared by:

(a) obtaining the amount of fluensulfone, the amount of rheology modifying agent, and the agrochemically acceptable inert additive, (b) heating the rheology modifying agent, the fluensulfone, and the agrochemically acceptable inert additive to prepare the suspension concentrate seed treatment formulation.

In some embodiments, the rheology modifying agent is a polyamide polymer.

In some embodiments, the rheology modifying agent is heated to its melting point. Preferably, the rheology modifying agent is heated until it is completely melted prior to mixing with the fluensulfone. In some embodiments, the rheology modifying agent is heated to a temperature of about 40° C. to about 100° C. In some embodiments, the rheology modifying agent is heated to a temperature of about 50° C. to about 90° C. In some embodiments, the rheology modifying agent is heated to a temperature of about 60° C. to about 80° C. In some embodiments, the rheology modifying agent is heated to a temperature of about 100° C. to about 400° C. In some embodiments, the rheology modifying agent is heated to a temperature of about 200° C. to about 300° C.

In some embodiments, the rheology modifying agent is heated in the presence of an organic solvent. In some embodiments, the fluensulfone is heated prior to being mixed with the heated rheology modifying agent.

In some embodiments, the fluensulfone and the rheology modifying agent are heated until both are completely melted prior to mixing with the agrochemically acceptable inert additive.

In some embodiments, the fluensulfone and the rheology modifying agent are heated at a temperature of 70° C. to 95° C. In some embodiments, the fluensulfone and the rheology modifying agent are heated at a temperature of 80° C. to 85° C.

In some embodiments, the process further comprises adding water to the mixture comprising the melted fluensulfone and rheology modifying agent.

In some embodiments, room temperature water is added.

In some embodiments, the water is added under 1200-2200 rpm shear. In some embodiments, the water is added under 1700 rpm shear.

In some embodiments, the process further comprises cooling the mixture to a temperature of 40° C. or less to obtain the seed treatment formulation.

In some embodiments, the agrochemically acceptable inert additive is selected from a group consisting of surfactants, stabilizers, ultra violet absorbers, radical scavengers and antioxidants, adhesives, neutralizers, thickeners, binders, sequestrates, biocides, buffers preservatives, anti-freeze agents, and any combination thereof.

In some embodiments, step c) of the process is performed under stirring. In some embodiments, step c) of the process is performed at a temperature of less than 70° C.

In some embodiments, the process further comprises a step of adding water to the seed treatment formulation obtained in step c). In some embodiments, the water is added under agitation. Preferably, the water is added under agitation of at least 400 rpm shear stirrer (Caulis type).

In some embodiments, the formulation is a powder for dry seed treatment.

In some embodiments, the powder for dry seed treatment is prepared by:

a) obtaining the amount of fluensulfone, the amount of rheology modifying agent in solid form and the agrochemically acceptable inert additive, b) milling the solid rheology modifying agent, and c) mixing the milled solid rheology modifying agent with the obtained fluensulfone and the agrochemically acceptable inert additive until homogenization to prepare the seed treatment formulation.

In some embodiments, the rheology modifying agent is clay. In some embodiments, the rheology modifying agent is silica. In some embodiments, the rheology modifying agent is a combination of clay and silica.

In some embodiments, the rheology modifying agent is milled to achieve a particle size distribution wherein at least 90% of the particles have a size of below 35 microns. In some embodiments, the rheology modifying agent is milled to achieve a particle size distribution wherein at least 50% the particles have a size of below 15 microns. In some embodiments, the rheology modifying agent is milled to achieve a particle size distribution wherein at least 10% of the particles have size of below 7 microns.

In some embodiments, the rheology modifying agent is milled to achieve a particle size distribution wherein at least 90% of the particles have a size of below 35 microns, at least 50% the particles have a size of below 15 microns, and at least 10% of the particles have size of below 7 microns.

In some embodiments, the rheology modifying agent is milled using a hammer mill.

Each embodiment disclosed herein is contemplated as being applicable to each of the other disclosed embodiments. Thus, all combinations of the various elements described herein are within the scope of the invention. In addition, the elements recited in formulation embodiments can be used in the method, process, and use embodiments described herein and vice versa.

Experimental Section

EXAMPLE 1

Microsphere (Suspension Concentrate) Formulation

The following formulation of Table 1 was prepared.

TABLE 1

| CAS Number | Raw Material | Quantity for 1000 liter |
|---|---|---|
| 318290-98-1 | Fluensulfone (A.I. as 100%) | 200.00 Kg (200 Kg as 100%) |
| 61791-12-6 | Berol 829 (Ethoxylated Castor Oil 20 EO) | 28.69 Kg |
| 26264-06-2 | Rhodacal 60 BE/C (linear alkyl benzene sulfonate calcium salt) | 20.19 Kg |
| 9038-95-3 | Ethylan NS 500 LQ (Alcohol Polyglycol ether) | 13.28 Kg |
| 128-37-0 | Ionol CP (2,6-Di-tert-butyl-4-methylphenol) | 2.23 Kg |

TABLE 1-continued

| CAS Number | Raw Material | Quantity for 1000 liter |
|---|---|---|
| 8013-07-8 | Epoxol (Soybean oil epoxidized) | 2.23 Kg |
| 108-32-7 | Propylene Carbonate | 53.14 Kg |
| Proprietary | Atlox Rheostrux 200 PA | 300.00 Kg |
| 67742-94-5 | Solvesso 200 ULN | 131.77 Kg |
| 7732-18-5 | Water | Up to 1000 mL (about 305 Kg) |

Specifications:

Fluensulfone conc.—200.00 g/l (188.00-212.00)

Density—1.062 g/ml pH (1% in water)—5.00-8.5

Viscosity (6rpm—spindle 2) 20° C.-600 cPs

Preparation Method:

Step 1:

The mixture of Rheostrux with Castor Oil 20 EO, Calcium Dodecyl Benzene Sulfonate, Alcohol Polyglycol Ether, Ionol CP, Epoxol, Propylene Carbonate, Solvesso 200 ULN, and Technical Fluensulfone was heated at 80 to 85° C. until complete melting/solubilization of Fluensulfone and Rheostrux.

Step 2:

Room temperature water was added over the heated mixture (Step 1) above, under high shear (1700 rpm) using a Cawles stirrer. The formulation was cooled while maintaining high agitation until a temperature of <40° C. was reached.

Critical Points:

Temperature of Rheostrux 200 PA dissolution

High shear to incorporate Fluensulfone in the Polymer Rheostrux 200 PA

Results:

The product was stable at 40° C. (8 weeks).

EXAMPLE 2

DS (Powders for Dry Seed Treatment)

A fluensulfone powder formulation is made by milling clay and silica to reach a desired particle size distribution. Once the desired particle size distribution is reached, fluensulfone is mixed with the milled clay and silica until homogenization is achieved.

EXAMPLE 3

Effectiveness of the Seed Treatment Formulation

The seed treatment formulations prepared using Examples 1 and 2 as well as Avicta™ 500FS were evaluated for their effectiveness in controlling *Meloidogyne javanica* in soybeans. The nematicidal activity of each formulation was evaluated at 45 days after emergence.

The results are shown in Table 2 below.

TABLE 2

| Treatment | Application Rate (g i.a.i./100 kg seed) | Nematicidal Activity Reduction (%) |
|---|---|---|
| Avicta ™ 500 FS abamectin | 50 | 55 |

TABLE 2-continued

| Treatment | Application Rate (g i.a.i./100 kg seed) | Nematicidal Activity Reduction (%) |
|---|---|---|
| 200 CF (Example 1) | 50 | 85 |
| 170 WP (Example 2) | 50 | 72 |

Nematicide Activity Reduction (%)=% of nematode population reduction in the roots at 45 days after emergence The formulations comprising fluensulfone showed efficient nematicidal activity as seed treatment compared to the commercial formulation Avicta™ 500 FS flowable concentrate sold by Syngenta that contain 46.3% abamectin (71751-41-2).

EXAMPLE 4

Effect of Fluensulfone Seed Treatment in Cotton on the Yield

The seed treatment formulation of Example 1 and Avicta™ 500 FS, a commercially available seed treatment formulation, were evaluated for their effectiveness in controlling *Meloidogyne* spp (*M. Javanica* and *M. Incognita*) in Cotton under natural nematode pressure conditions. The nematicidal activity of each formulation was evaluated at 60 days after planting.

The results are shown in FIG. 1.

Material and Methods

Treated seeds were sawn in 7 different fields with natural nematode pressure conditions (Medium-High infestation level). Each plot was harvest at the end of the season and the yield was measured. The graph below describes the average of 7 field trials.

Results

The fluensulfone seed treatment formulation, when applied at various rates, showed increased yield over the untreated seeds and seed treated with Avicta™ 500 FS (FIG. 1).

EXAMPLE 5

Evaluation of Nematicidal Activity of Fluensulfone Formulations Against Different Type of Nematodes The seed treatment formulation of Example 1 and Avicta™ 500 FS were applied to different type of nematodes under field condition.

Material and Methods 1 gr of Fluensulfone was applied on 1 kg of cotton (*Gossypium hirsutum*) seeds. Treated seeds were seeded into in the field with natural nematodes pressure conditions, the standard in the trial was Avicta and the control was untreated seeds. The number of nematodes in the soil was evaluated at time 0 (planting day). 60 days after planting (DAP), nematodes count was conducted for both soil and plant roots (10 gr).

Results

Nematodes total count on time zero was 180 per 50 gr soil.

TABLE 3

| Nematodes count 60 DAP in the soil and the roots | | | | | | | |
| --- | --- | --- | --- | --- | --- | --- | --- |
| | Meloidogyne | | Pratylenchus | | Helicotylenchus | | Rotylenchulus | |
| Treatment | Soil | Roots | Soil | Roots | Soil | Roots | Soil | Roots |
| Untreated | 1140 | 60 | 60 | 480 | 960 | 60 | 0 | 0 |
| Fluensulfone 1 gr/1 kg seeds | 510 | 60 | 60 | 240 | 630 | 180 | 0 | 0 |
| Avicta | 8160 | 120 | 120 | 600 | 600 | 240 | 0 | 0 |

CONCLUSION

Trial results showed that seed treatment formulations with Fluensulfone are highly effective against different types of nematodes. The total count of nematodes in the soil in time zero was 180, the nematodes reproduces rapidly (each female lays 500 eggs) some nematode species penetrate to the plant while others remain in the soil. Fluensulfone Seed Treatment reduces the number of nematodes in the soil vs. the standard and the untreated seeds so less nematodes were able to penetrate the roots and to cause damage to the plants.

These experimental results clearly showed that fluensulfone seed treatment formulations are effective in nematodes control and yield increase.

While the present subject matter has been shown and described with reference to preferred embodiments thereof, it will be understood by those skilled in the art that many alternatives, modifications and variations may be made thereto without departing from the spirit and scope thereof. Accordingly, it is intended to embrace all such alternatives, modifications, and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

The invention claimed is:

1. A A formulation for seed treatment comprising amount of fluensulfone, an effective amount of a rheology modifying agent and an agrochemically acceptable inert additive, wherein the rheology modifying agent forms microspheres comprising the fluensulfone, wherein the fluensulfone is dispersed or dissolved in a rate-controlling polymer matrix but not encapsulated by the rheology modifying agent, and wherein:
  a) the amount of the fluensulfone is about 15% to about 25% of the total formulation by weight,
  b) the amount of the rheology modifying agent is about 25% to about 40% of the total formulation by weight,
  c) the weight ratio of the rheology modifying agent to the fluensulfone is from about 3:1 to about 1:1, and
  d) the rheology modifying agent is a thermoplastic polyamide or a thermoplastic copolyamide.

2. The formulation of claim 1, wherein:
  a) the amount of the fluensulfone is about 18% to about 22% of the total formulation by weight, and/or
  b) the amount of the rheology modifying agent is about 30% to about 37% of the total formulation by weight.

3. The formulation of claim 1, wherein:
the agrochemically acceptable inert additive is selected from the group consisting of surfactants, emulsifiers, stabilizers, solvents, light stabilizers, ultra violet absorbers, radical scavengers and antioxidants, adhesives, neutralizers, thickeners, binders, sequestrates, biocides, buffers, preservatives, anti-freeze agents, and any combination thereof.

4. The formulation of claim 3, wherein:
  a) the emulsifier is selected from the group consisting of alkoxylated vegetable oil, ethoxylated vegetable oil, dodecylbenzene calcium sulfonate, ethylene oxide-propylene oxide di-block copolymer, ethylene oxide-propylene oxide tri-block copolymer, poly (ethylene glycol-ran-propylene glycol) monobutyl ether and combinations thereof,
  b) the stabilizer is selected from the group consisting of epoxidated vegetable oil, pentaerythritol tetrakis (3,5-di-tert-butyl-4-hydroxyhydrocinnamate), tris (2,4-di-tert-butylphenyl)phosphite, benzotriazole, 2,2,6, 6-tetramethylpiperidine, 2,6-di-tert-butyl-p-cresol, N, N'-di-2-butyl-1,4-phenylenediamine and/or and combinations thereof,
  c) the solvent is selected from the group consisting of propylene carbonate, naphthalene, water and combinations thereof.

5. The formulation of claim 1, wherein:
  a) the formulation further comprises a solidifier and/or a liquid carrier,
  b) the formulation is formulated for controlled release of the fluensulfone, and/or
  c) the formulation is a suspension concentrate, a powder for dry seed treatment, an oil dispersion, a water dispersion, or a capsule suspension.

6. The formulation of claim 1, wherein:
  a) the agrochemically acceptable inert additive is other than sodium 2-acryloylamino-2-methylpropane-1-sulfonate/ethyl acrylate block copolymer,
  b) the agrochemically acceptable inert additive is other than acetophenone, and/or
  c) the formulation is other than an oil-in-water emulsion formulation comprising 51% by weight of fluensulfone, 16.8% by weight of acetophenone, 0.4% by weight of 2, 6-di-tert-butyl-4-methylphenol, 18 by weight of castor oil ethylene oxide, 2.78% by weight of sodium 2-acryloylamino-2-methylpropane-1-sulfonate/ethyl acrylate block copolymer, 2.78% by weight of ethoxylated polypropylene oxide, 2.2% by weight of propylene glycol, 0.18 by weight of silicone based antifoaming agent and 23% by weight of water.

7. The formulation of claim 1, wherein the amount of fluensulfone is 20% of the total formulation by weight and the amount of the rheology modifying agent is 30% of the total formulation by weight.

8. A mixture comprising an effective amount of fluensulfone and an effective amount of rheology modifying agent, wherein the rheology modifying agent forms microspheres comprising the fluensulfone, wherein the fluensulfone is dispersed or dissolved in a rate-controlling polymer matrix but not encapsulated by the rheology modifying agent, and wherein:

a) the amount of the fluensulfone is about 15% to about 25% of the mixture by weight,
   b) the amount of the rheology modifying agent is about 25% to about 40% of the mixture by weight,
   c) the weight ratio of the rheology modifying agent to the fluensulfone is from about 3:1 to about 1:1, and
   d) the rheology modifying agent is a thermoplastic polyamide or a thermoplastic copolyamide.

9. A method for controlling nematodes comprising treating a seed of a host plant with the formulation of claim 1 so as to thereby control nematodes.

10. The method of claim 9, wherein:

a) the fluensulfone is applied at a rate between 10 to 100 g of fluensulfone per 100 kg of seeds,
   b) the host plant is soybean, corn, sunflower, drybean, cotton, or wheat, and/or
   c) the nematode is Meloidogyne javanica.

11. A process for preparing the seed treatment formulation of claim 1, wherein the process comprises the steps of:

a) obtaining the amount of fluensulfone, the amount of the rheology modifying agent, and the agrochemically acceptable inert additive, and
   b) mixing the fluensulfone, the rheology modifying agent and the agrochemically acceptable inert additive to prepare the seed treatment formulation.

12. The process of claim 11, wherein the fluensulfone obtained has a purity of greater than 95%, a purity greater than 98% or a purity of 100%.

13. The process of claim 11, wherein the seed treatment formulation is a suspension concentrate prepared by:

(i) (a) obtaining the amount of fluensulfone, the amount of rheology modifying agent, and the agrochemically acceptable inert additive, (b) heating the rheology modifying agent, and (c) mixing the heated rheology modifying agent with the obtained fluensulfone and the agrochemically acceptable inert additive to prepare the suspension concentrate seed treatment formulation,
   (ii) (a) obtaining the amount of fluensulfone, the amount of rheology modifying agent, and the agrochemically acceptable inert additive, (b) heating the rheology modifying agent and the fluensulfone, and (c) mixing the heated rheology modifying agent and fluensulfone with the agrochemically acceptable inert additive to prepare the suspension concentrate seed treatment formulation, or
   (iii) (a) obtaining the amount of fluensulfone, the amount of rheology modifying agent, and the agrochemically acceptable inert additive, and (b) heating the rheology modifying agent, the fluensulfone, and the agrochemically acceptable inert additive to prepare the suspension concentrate seed treatment formulation.

14. The process of claim 13, wherein:

a) the rheology modifying agent and/or fluensulfone is heated to its melting point,
   b) the process further comprises a step of adding water, optionally under agitation, to the seed treatment formulation obtained in step (c) of claim 13 (i), step (c) of claim 13 (ii), or step (b) of claim 13 (iii), and/or
   c) the process further comprises cooling the formulation, preferably while stirring, until a temperature of 40° C. or less is reached.

* * * * *